United States Patent [19]
Yoshino

[11] Patent Number: 5,467,233
[45] Date of Patent: Nov. 14, 1995

[54] MAGNETIC RECORDING AND REPRODUCING APPARATUS FOR REPRODUCING A MAGNETIC TAPE BEING FED AT HIGH SPEED

[75] Inventor: Tadashi Yoshino, Neyagawa, Japan

[73] Assignee: Matsushita Electric Industrial Co., Ltd., Osaka, Japan

[21] Appl. No.: 113,352

[22] Filed: Aug. 30, 1993

Related U.S. Application Data

[63] Continuation of Ser. No. 609,730, Nov. 6, 1990, abandoned.

[30] Foreign Application Priority Data

Nov. 10, 1989 [JP] Japan .................................. 1-291228

[51] Int. Cl.$^6$ .................................................. G11B 15/52
[52] U.S. Cl. ...................... 360/70; 360/73.14; 360/73.11
[58] Field of Search .................................. 360/73.14, 70, 360/73.09, 73.08, 73.11, 73.13

[56] References Cited

U.S. PATENT DOCUMENTS

| 4,516,740 | 5/1985  | Yoshino et al. ............... 360/73.08 |
| 4,561,608 | 12/1985 | O'Gwynn et al. . |
| 4,620,241 | 10/1986 | Ono .............................. 360/73.14 |
| 4,626,936 | 12/1986 | Yoshino ......................... 360/70 |
| 4,631,605 | 12/1986 | O'Gwynn ....................... 360/70 |
| 4,649,441 | 3/1987  | Louth ......................... 360/73.14 X |
| 4,777,413 | 10/1988 | Yoshimura et al. . |
| 4,985,786 | 1/1991  | Arai et al. ..................... 360/76 |

FOREIGN PATENT DOCUMENTS

| 0197782   | 10/1986 | European Pat. Off. . |
| 0236588   | 9/1987  | European Pat. Off. . |
| 0254511   | 1/1988  | European Pat. Off. . |
| 61-190746 | 8/1986  | Japan ......................... 360/73.14 |

Primary Examiner—Aristotelis Psitos
Assistant Examiner—James T. Wilson
Attorney, Agent, or Firm—Stevens, Davis, Miller & Mosher

[57] ABSTRACT

Disclosed is a magnetic picture recording and reproducing apparatus in which a magnetic tape is transported at a high speed in a fast-forwarding (or rewinding) playback mode so that a viewer can understand the details of records on the magnetic tape within a shortest possible time. In the magnetic picture recording and reproducing apparatus, the fact that the hub diameters of a pair of reels for supplying and taking up the magnetic tape are larger than capstan diameter is noted and a high-speed picture reproduction in the fast-forwarding playback mode has been attained within a controllable rotation speed range of a motor for driving the take-up reel turntable.

8 Claims, 2 Drawing Sheets 5,467,233

MAGNETIC RECORDING AND REPRODUCING APPARATUS FOR REPRODUCING A MAGNETIC TAPE BEING FED AT HIGH SPEED

This application is a continuation of application Ser. No. 07/609,730, filed Nov. 6, 1990 (abandoned).

BACKGROUND OF THE INVENTION

1. Field of the Invention

This invention relates to a magnetic picture recording and reproducing apparatus, and more particularly to such an apparatus which can effectively reproduce pictures from a magnetic tape in a fast-forwarding play-back mode or in a rewinding playback mode.

2. Description of the Related Art

FIG. 1 is a block diagram of a prior art magnetic picture recording and reproducing apparatus in a fast-forwarding playback mode.

As shown in FIG. 1, a magnetic tape 1 is supplied from a supply reel, which is on a supply reel turntable 2, to be fed past a rotary cylinder 3 having rotary heads and is transported by a capstan 4 firmly pressed against a pinch roller 5 so as to be taken by to a take-up reel which is on a take-up reel turntable 6.

Referring to FIG. 1, a frequency generator (FG) 8 and a rotation phase detector (PG) 9 are associated with a rotary cylinder motor 7 direct driving the rotary cylinder 3 so as to generate respectively a frequency signal and a rotation phase signal corresponding to the rotation speed of the rotary cylinder 3, and these signals are applied to a rotary cylinder (CY) speed control circuit 10 and a CY phase control circuit 13 respectively.

A speed command signal instructing the speed of the magnetic tape 1 in the fast-forwarding playback mode is generated from a speed command circuit 15 to be applied to each of a reference CY speed generating circuit 11 and a reference CY phase generating circuit 14. A reference rotary-cylinder speed signal and a reference rotary-cylinder phase signal generated from the reference CY speed generating circuit 11 and the reference CY phase generating circuit 14 are applied to the CY speed control circuit 10 and the CY phase control circuit 13 respectively, and a speed error signal and a phase error signal relative to the reference speed and phase of the rotary cylinder 3 are generated from the CY speed control circuit and the CY phase control circuit 13 respectively.

These two error signals are applied to a CY driver circuit 12 which drives the rotary cylinder motor 7.

On the other hand, a frequency signal corresponding to the rotation speed of the capstan 4 is generated from a frequency generator (FG) 18 associated with a capstan motor 17 directly driving the capstan 4 and is applied to a capstan (CAP) speed control circuit 19. The magnetic-tape speed command signal from the speed command circuit 15 is also applied to a reference capstan (CAP) speed generating circuit 20. The reference CAP speed generating circuit 20 generates a reference capstan speed signal corresponding to the magnetic-tape speed command, and this reference capstan speed signal is applied to the CAP speed control circuit 19. A speed error signal relative to the reference speed of the capstan 4 is generated from the CAP speed control circuit 19.

A control signal recorded on the magnetic tape 1 is reproduced by a control head 16 to be applied to a CAP phase control circuit 22. The magnetic-tape speed command signal from the speed command circuit 15 is also applied to a reference CAP phase generating circuit 23. A reference capstan phase signal corresponding to the magnetic-tape speed command is generated from the reference CAP phase generating circuit 23 and is applied to the CAP phase control circuit 22, and a phase error signal relative to the reference capstan phase signal is obtained.

The output signal of the CAP speed control circuit 19 and that of the CAP phase control circuit 22 are applied to a CAP driver circuit 21 which drives the capstan motor 17.

The take-up reel turntable 6 is driven by the capstan motor 17 through a rotation transmission mechanism (not shown) so as to take up the magnetic tape 1 transported by the capstan 4 firmly pressed against the pinch roller 5.

In the prior art magnetic picture recording and reproducing apparatus having the construction shown in FIG. 1, it would be attainable to increase the tape speed in the fast-forwarding playback mode N times as high as that in the record mode, if it were possible to increase the capstan rotation speed as high as N times. However, because of a very small diameter of the capstan 4, there has been inevitably a limitation in increasing the rotation speed of the capstan motor 17 to realize a magnetic tape speed in the fast-forwarding playback mode N times faster than that in the record mode. Thus, the prior art apparatus has had the problem that the desired high-speed picture reproduction from the magnetic tape 1 in the fast-forwarding playback mode cannot be attained.

SUMMARY OF THE INVENTION

It is an object of the present invention to realize a high speed transportation of a magnetic tape in a fast-forwarding (or rewinding) playback mode of a magnetic picture recording and reproducing apparatus.

A more practical object of the present invention is to provide a magnetic picture recording and reproducing apparatus which is capable of a high-speed picture reproduction in the fast-forwarding (or rewinding) playback mode, by use of the fact that the hub diameters of the magnetic tape reels are larger than the capstan diameter and by implementing an apparatus in which the rotation speed of the drive motor for the take-up reel is controlled within its controllable rotation speed range.

DESCRIPTION OF THE PREFERRED EMBODIMENT

Figure 1:
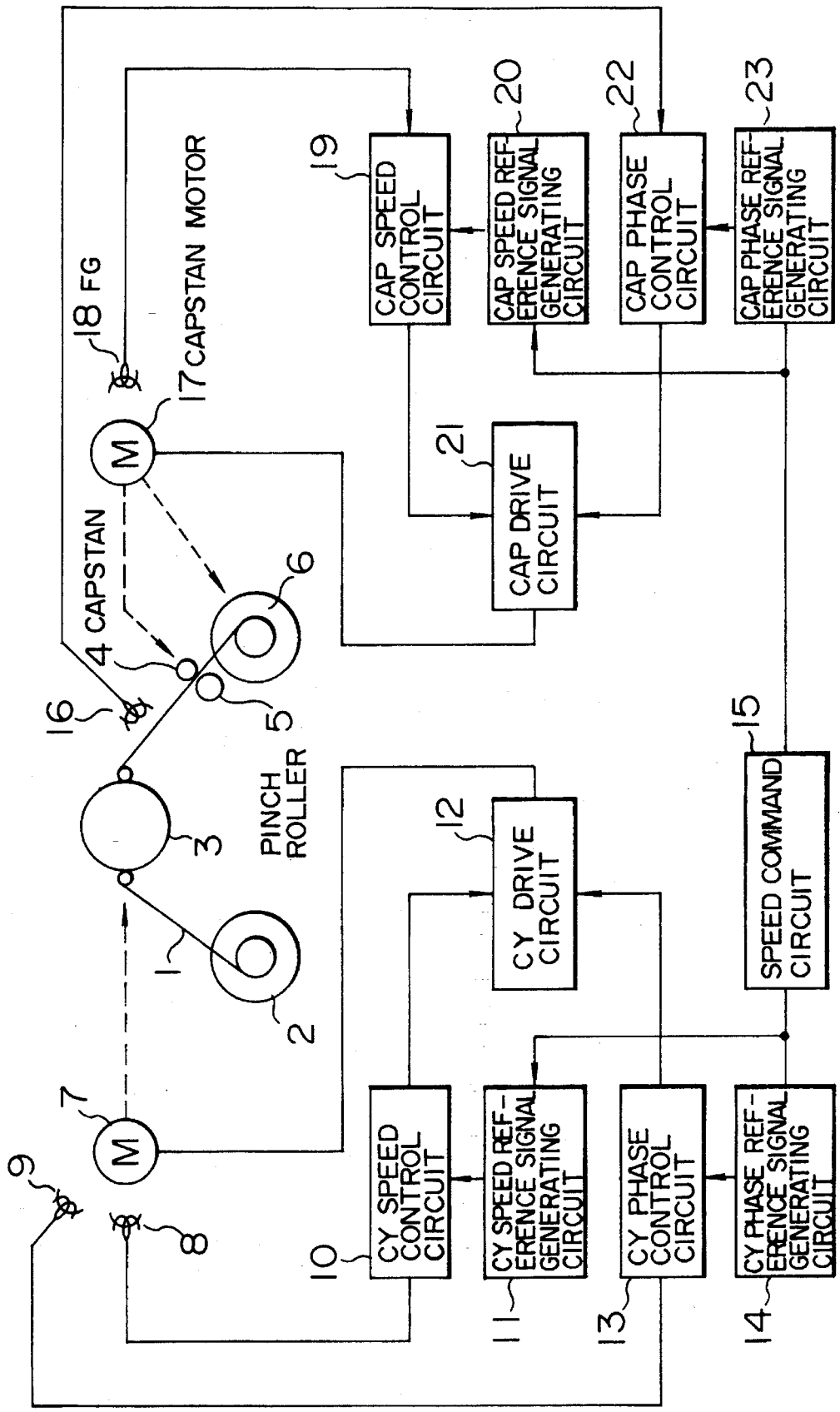
FIG. 1 is a block diagram of a prior art magnetic picture recording and reproducing apparatus in its fast-forwarding playback mode.
Figure 2:
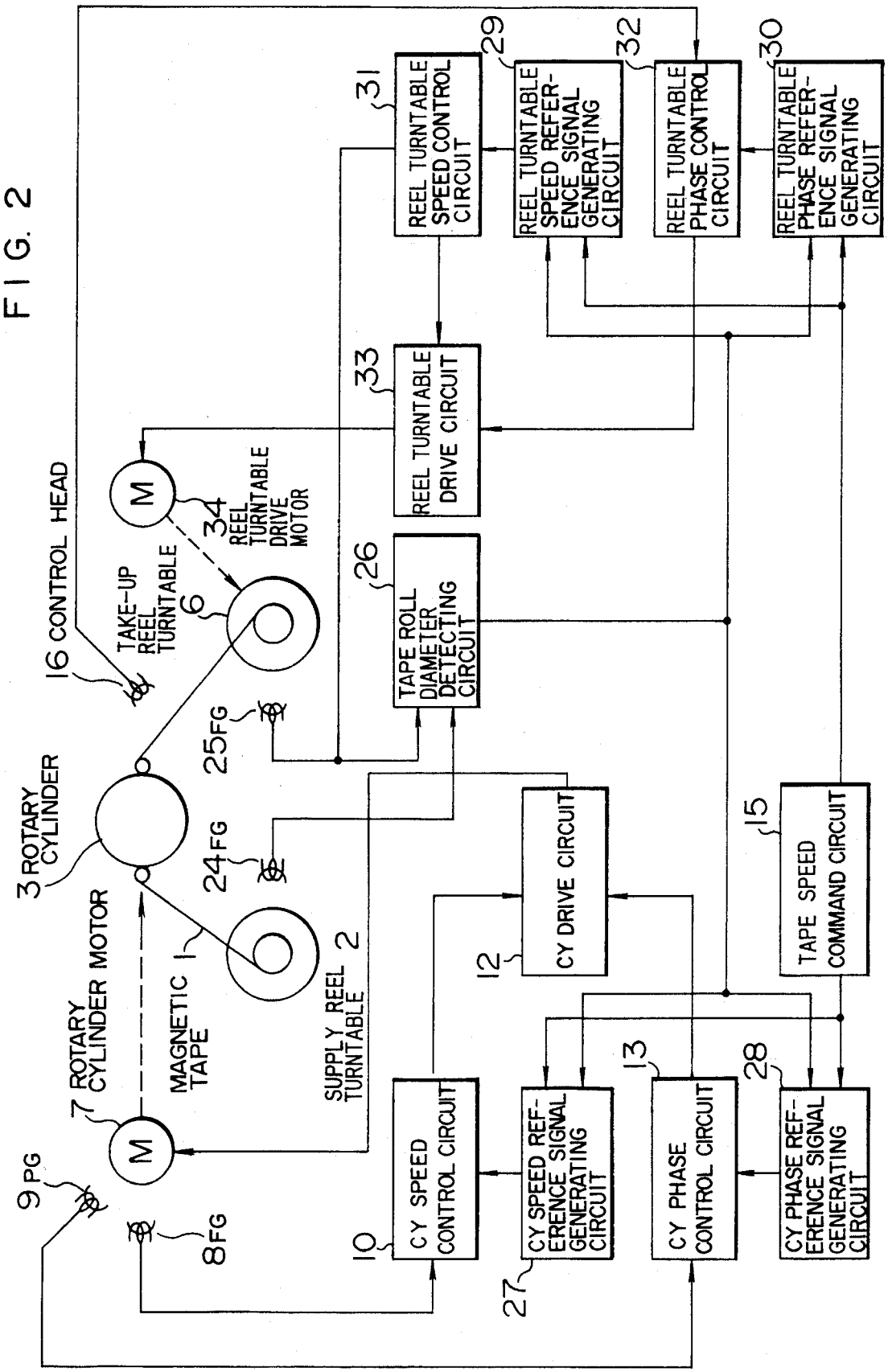
FIG. 2 is a block diagram of an embodiment of the magnetic picture recording and reproducing apparatus of the present invention is its high-speed fast-forwarding playback mode.

In FIG. 2, the same reference numerals are used to designate the same parts appearing in FIG. 1 so as to dispense with repetition of the same description.

Referring to FIG. 2, frequency generators (FG) 24 and 25 are associated with the supply reel turntable 2 and the take-up reel turntable 6, respectively. A tape roll diameter detecting circuit 26 receives the outputs $n_S$ and $n_T$ of the respective frequency generators 24 and 25 as its inputs and calculates the ratio $n_T/n_S$, thereby detecting the radius $R_T$ of the roll of the magnetic tape 1 on the take-up reel. Each of a reference rotary-cylinder (CY) speed generating circuit 27 and a reference rotary-cylinder (CY) phase generating circuit 28 receives both the output of the roll diameter detecting circuit 26 and that of the magnetic-tape speed command circuit 15 as their inputs. Each of the reference reel turntable-speed generating circuit 29 and a reference reel turntable phase generating circuit 30 receives both the output of the roll diameter detecting circuit 26 and that of the magnetic-tape speed command circuit 15. A reel turntable speed control circuit 31 receives both the output of the frequency generator (FG) 25 and that of the reference reel turntable speed generating circuit 29 as its inputs and generates a speed error signal. A reel turntable phase control circuit 32 receives both the output of the control head 16 and that of the reference reel turntable phase generating circuit 30 as its inputs and generates a phase error signal. A reel turntable driver circuit 33 receives both the output of the reel turntable speed control circuit 31 and that of the reel turntable phase control circuit 32 as its inputs, and a reel turntable drive motor 34 is driven by the reel turntable driver circuit 33.

The operation of the illustrated embodiment in the high-speed fast-forwarding mode will now be described with reference to FIG. 2. A magnetic tape 1 supplied from the supply reel is fed past the rotary cylinder 3 to be taken up to the take-up reel driven by the reel turntable drive motor 34.

The respective rotation speeds of the supply and take-up reel turntables 2 and 6 are detected by the frequency generators (FG) 24 and 25 and the output signals of these frequency generators (FG) 24 and 25 are applied to the roll diameter detecting circuit 26. The output signal of the frequency generator (FG) 25 is also applied to the reel turntable speed control circuit 31.

The sum of the sectional areas of the rolls of the magnetic tape 1 wound around the two reels is constant. That is, the following relation is always satisfied:

$$\pi(R_S^2 - r_i^2) + \pi(R_T^2 - r_i^2) = K_t \text{ (constant)} \tag{1}$$

where, $R_S$: Radius of the magnetic tape roll on the supply reel
$r_i$: Radius of the hub of each reel
$R_T$: Radius of the magnetic tape roll on the take-up reel
Thus, the following relation holds:

$$R_S^2 + R_T^2 = K_1 \text{ (constant)} + 2r_i^2 \tag{2}$$

Further, because the peripheral speeds of the two magnetic tape rolls are equal to each other, the following relation holds:

$$R_S \cdot n_S = R_T \cdot n_T \tag{3}$$

where, $n_S$: Rotation speed of the supply reel
$n_T$: Rotation speed of the take-up reel
From the equations (2) and (3), the following equations are obtained:

$$\left( \left( \frac{n_T}{n_S} \right)^2 + 1 \right) R_T^2 = K_1' + 2r_1^2 \tag{4}$$

-continued
$$R_T = \sqrt{ K_1' + 2r_1^2 / \left( \frac{n_T}{n_S} \right)^2 + 1 } \tag{5}$$

Accordingly, by calculating the ratio $n_T/n_S$ in the roll diameter detecting circuit 26, the radius of the magnetic tape roll on the take-up reel can be calculated, so that the positions of the leading part, middle part and trailing part of the magnetic tape 1 can be detected.

The output signal of this roll diameter detecting circuit 26 is applied to each of the reference cylinder (CY) speed generating circuit 27, the reference cylinder (CY) phase generating circuit 28, the reference reel turntable speed generating circuit 29 and the reference reel turntable phase generating circuit 30. In addition to the above input signal, the magnetic-tape speed command signal from the speed command circuit 15 instructing the speed of the magnetic tape 1 is applied to each of the circuits 27, 28, 29 and 30. As a result, the reference cylinder speed signal, the reference cylinder phase signal, the reference take-up reel turntable speed signal and the reference take-up reel turntable phase signal corresponding to the detected magnetic tape positions and the magnetic-tape speed command are generated from the circuits 27, 28, 29 and 30 respectively. These reference signals are applied, together with the output signals from the frequency generator (FG) 8, the rotation phase detector (PG) 9, the frequency generator (FG) 25 and the control head 16, to the CY speed control circuit 10, the CY phase control circuit 13, the reel turntable speed control circuit 31 and the reel phase control circuit 32 respectively, so as to obtain a rotary cylinder speed error signal, a rotary cylinder phase error signal, a take-up reel turntable speed error signal and a take-up reel turntable phase error signal relative to the respective reference signals.

The former two error signals and the latter two error signals are applied to the CY driver circuit 12 and the reel turntable driver circuit 33 respectively so as to control the rotation of the rotary cylinder motor 7 and that of the reel turntable drive motor 34 respectively.

The magnetic tape 1 is transported at a speed V given by $$V = 2\pi \cdot R_T \cdot n_T \tag{6}$$

In order to maintain constant the tape transport speed V, the rotation speed $n_T$ of the take-up reel turntable 6 is to be selected so as to satisfy the following relation:

$$n_T = K_2 \text{ (constant)}/(2\pi \cdot R_T) \tag{7}$$

Therefore, when the reference speed signal is selected so as to satisfy the relation (7), and the value of $K_2$ at the leading and the trailing parts of the magnetic tape 1 is selected to be smaller than that at the middle part of the magnetic tape 1, the magnetic tape 1 is transported at a medium speed at its leading and trailing parts and at a high speed at its middle part while maintaining a constant speed in each of the leading and trailing parts and in the middle part.

In the embodiment described above, only the output signal of the frequency generator (FG) 25 associated with the take-up reel turntable 6 is applied to the reel turntable speed control circuit 31. However, it is apparent that the output signal of the frequency generator (FG) 24 associated with the supply reel turntable 2 may be utilized.

Further, in the illustrated embodiment, the control signal recorded on the magnetic tape 1 is reproduced by the control head 16 and applied to the reel-turntable phase control circuit 32 to be used also for the purpose of controlling the speed of the magnetic tape 1. However, the speed of the magnetic tape 1 can be controlled at a constant speed by the speed control system without phase information. Similarly, the rotation speed of the rotary cylinder 3 can also be controlled by the speed control system only.

Also, in the illustrated embodiment, the output signal of the frequency generator (FG) 25 associated with the take-up reel turntable 6 is applied to the reel turntable speed control circuit 31 as its input. However, when the capstan motor 17 acts also as the reel turntable drive motor 34 as shown in FIG. 1, the output signal of the frequency generator (FG) 18 may be applied to the reel turntable speed control circuit 31 as its input.

It will be understood from the foregoing description of the present invention that, in the high-speed fast-forwarding (or rewinding) playback mode, the rotation of the drive motor for driving the take-up reel turntable and that of the rotary cylinder motor are controlled on the basis of the detection output of the roll diameter detecting circuit detecting the radius of the magnetic tape roll on the take-up reel, and the leading and trailing parts of the magnetic tape are taken up at a medium speed, while the middle part of the magnetic tape is taken up at a high speed, so that the desired high-speed reproduction of pictures can be attained within a controllable rotation speed range of the drive motor for the take-up reel turntable.

I claim:

1. A magnetic picture recording and reproducing apparatus comprising:

reel driving means for driving a pair of reel turntables, respectively engaging with reel hubs of a pair of reels having a magnetic tape wound thereon, each of said turntables rotating with one of said reels in a direction so as to take up said magnetic tape onto at least one of said reels;

rotary cylinder driving means for driving a rotary cylinder disposed between said pair of reel turntables;

rotation speed detecting means for detecting a rotation speed of said pair of reel turntables;

rotation phase detecting means for detecting a rotational phase of said pair of reel turntables;

tape roll diameter detecting means for detecting roll diameters of tape respectively wound on said pair of reels, based on the output of said rotation speed detecting means;

speed command means for outputting a desired magnetic tape speed;

reference generating means for generating a reference speed and a reference phase respectively for said rotary cylinder based on the output of said tape roll diameter detecting means and the output of said speed command means;

reference setting means for setting a reference speed and a reference phase for said pair of reel turntables;

detecting means for detecting the rotation speed and the rotation phase respectively of said rotary cylinder;

means, operatively associated with said detecting means which detects the rotation speed and the rotation phase respectively of said rotary cylinder and said reference generating means, for comparing the detected rotation speed of said rotary cylinder with the reference speed for said rotary cylinder and for generating a rotary cylinder speed error signal;

means, operatively associated with said detecting means which detects the rotation speed and the rotation phase respectively of said rotary cylinder and said reference generating means, for comparing the detected rotation phase of said rotary cylinder with the reference phase for said rotary cylinder and for generating a rotary cylinder phase error signal;

means for controlling the rotary cylinder driving means to control the rotation speed and the rotation phase respectively of said rotary cylinder on the basis of said rotary cylinder speed error signal and said rotary cylinder phase error signal;

means, operatively associated with said rotation speed detecting means and said reference setting means, for comparing the detected rotation speed of said pair of reel turntables with the reference speed of said pair of reel turntables and generating a reel turntable speed error signal;

means, operatively associated with said rotation phase detecting means and said reference setting means, for comparing the detected rotation phase of said pair of reel turntables with the reference phase of said pair of reel turntables and for generating a reel turntable phase error signal; and means for controlling the reel driving means to control the speed and the phase respectively of one of the reel turntables located on a tape take-up side based on said reel turntable speed error signal and said reel turntable phase error signal.

2. A magnetic picture recording and reproducing apparatus according to claim 1, wherein said tape roll diameter detecting means detects a leading part and a trailing part of the magnetic tape and controls said reference setting means so that a magnetic tape transport speed at the leading part and the trailing part of the magnetic tape is lower than a magnetic tape transport speed at a middle part of the magnetic tape.

3. A magnetic picture recording and reproducing apparatus according to claim 1, wherein said rotation speed detecting means comprises a first frequency generator, operatively associated with a first one of said reels, and second frequency generator, operatively associated with a second one of said reels.

4. A magnetic picture recording and reproducing apparatus according to claim 3, wherein said tape roll diameter detecting means detects a leading part and a trailing part of the magnetic tape and controls said reference setting means so that a magnetic tape transport speed at the leading part and the trailing part of the magnetic tape is lower than a magnetic tape transport speed at a middle part of the magnetic tape.

5. A magnetic picture recording and reproducing apparatus according to claim 1, wherein said rotation phase detecting means includes a control head for reproducing a control signal recorded on said magnetic tape, and said rotation phase detecting means determines said rotational phase of said pair of reel turntables in accordance with said control signal.

6. A magnetic picture recording and reproducing apparatus according to claim 5, wherein said tape roll diameter detecting means detects a leading part and a trailing part of the magnetic tape and controls said reference setting means so that a magnetic tape transport speed at the leading part and the trailing part of the magnetic tape is lower than a magnetic tape transport speed at a middle part of the magnetic tape.

7. A magnetic picture recording and reproducing apparatus according to claim 5, wherein said rotation speed detecting means comprises a first frequency generator, operatively associated with a first one of said reels, and a second frequency generator, operatively associated with a second one of said reels.

8. A magnetic picture recording and reproducing apparatus according to claim 6, wherein said rotation speed detecting means comprises a first frequency generator, operatively associated with a first one of said reels, and a second frequency generator, operatively associated with a second one of said reels.

* * * * *